United States Patent [19]

Speer

[11] Patent Number: 4,765,636
[45] Date of Patent: Aug. 23, 1988

[54] STEERABLE WHEELED PUSHCART

[76] Inventor: William W. Speer, 1323 Eleanor Way, Sunnyvale, Calif. 94087

[21] Appl. No.: 942,997

[22] Filed: Dec. 18, 1986

Related U.S. Application Data

[63] Continuation-in-part of Ser. No. 860,545, May 7, 1986, abandoned.

[51] Int. Cl.⁴ ............................................. A63H 33/02
[52] U.S. Cl. .................... 280/47.11; 446/451
[58] Field of Search ............... 280/47.11, 47.25, 63, 280/1.1 A, 1.186, 47.26; 446/451, 450

[56] References Cited

U.S. PATENT DOCUMENTS

| | | | |
|---|---|---|---|
| 321,434 | 7/1885 | Hanson | 280/11.28 |
| 1,097,102 | 5/1914 | Kounovsky | 280/47.11 |
| 1,223,766 | 4/1917 | Campbell | 280/47.11 |
| 1,310,651 | 7/1919 | DeLong | 280/47.11 |
| 1,631,546 | 6/1927 | Nistler | 280/23 |
| 1,681,876 | 8/1928 | Peterson | 280/47.11 |
| 1,996,546 | 4/1935 | Lindberg | 280/47.11 |
| 4,317,307 | 3/1982 | Conry | 280/47.34 |
| 4,595,380 | 6/1986 | Magers | 446/451 |
| 4,635,956 | 1/1987 | Morrissette | 280/47.26 |

FOREIGN PATENT DOCUMENTS 154260  3/1938  Austria ........................ 280/47.11

Primary Examiner—David M. Mitchell
Attorney, Agent, or Firm—Flehr, Hohbach, Test, Albritton & Herbert

[57]  ABSTRACT

A steerable pushcart (10) has a body (12). Wheels (14) are rotatably mounted on the body (12) and are positioned to support the body (12) on a surface (55). The wheels (14) have a fixed orientation with respect to the body (12). A handle (18) has a first end (40) with a steering wheel (38) for applying rotating force to the handle (18). The handle (18) has a second end (46) at an angle to the first end (40). The second end (46) of the handle (18) is rotatably attached to the body (12). The handle (18) has a lever arm (56) extending from the second end (46). The pushcart (10) has opposing springs (59, 60) connected between the lever arm (56) and the body (12). In operation, rotation of the handle (18) causes the body (12) to angle from its usual straight ahead position with respect to the handle (18), without a scissoring action with respect to the handle (18). In a four wheeled steerable pushcart (80), fron wheels (82) are pivotally responsive to rotation of the handle (96) when the front wheels (82) contact supporting surface (122), without any linkage between the handle (96) and the front wheels (82).

5 Claims, 2 Drawing Sheets

U.S. Patent  Aug. 23, 1988  Sheet 1 of 2  4,765,636
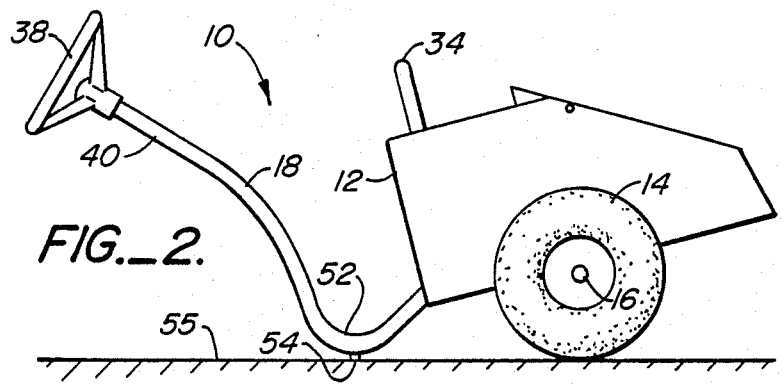
FIG._2.
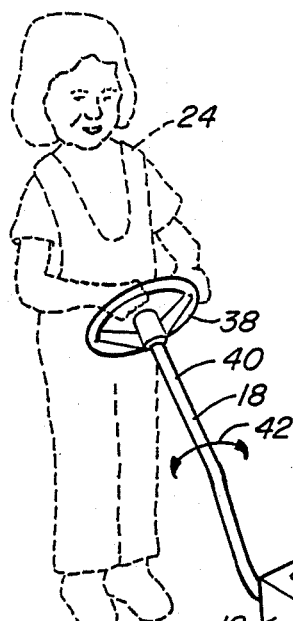
FIG._1.
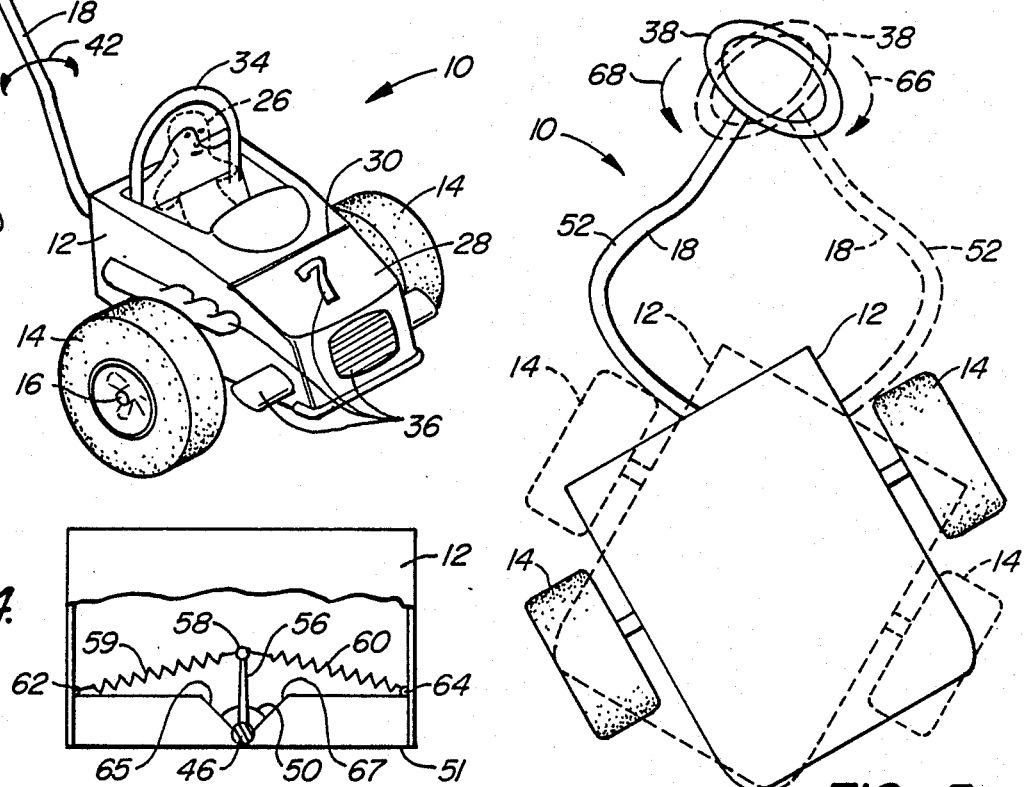
FIG._5.
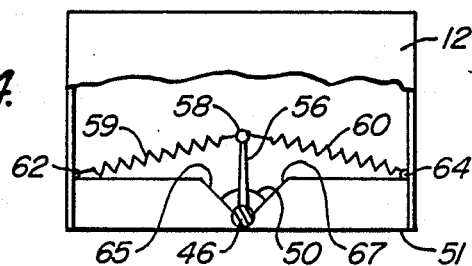
FIG._4.
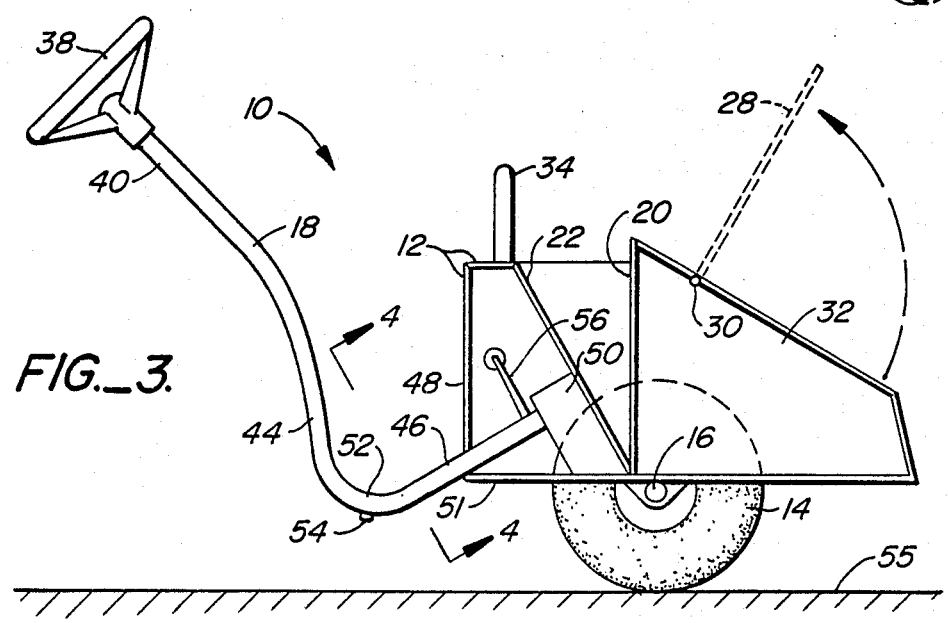
FIG._3.

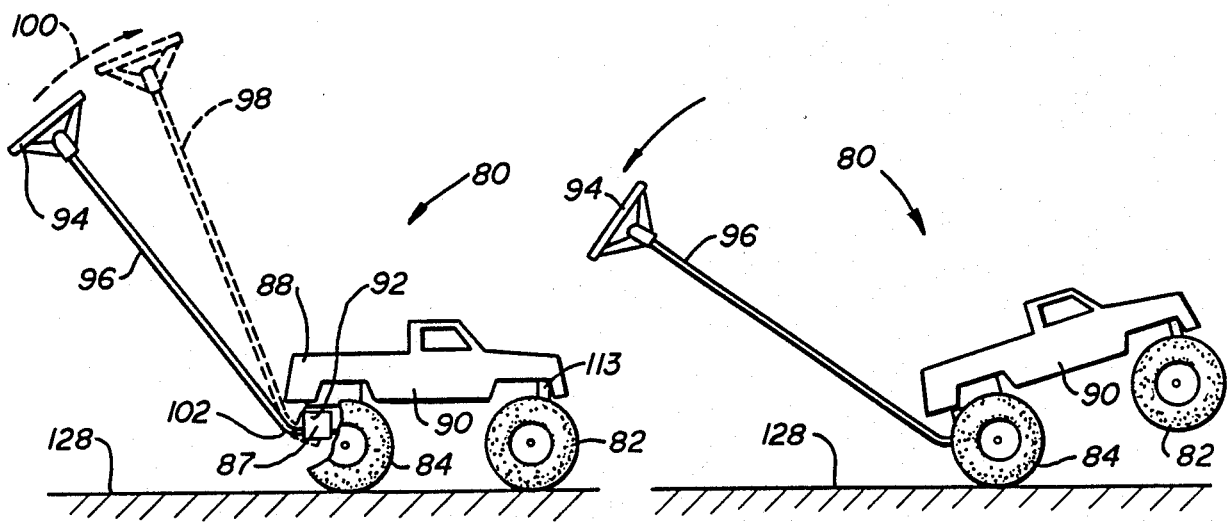
FIG._6.  FIG._6A.
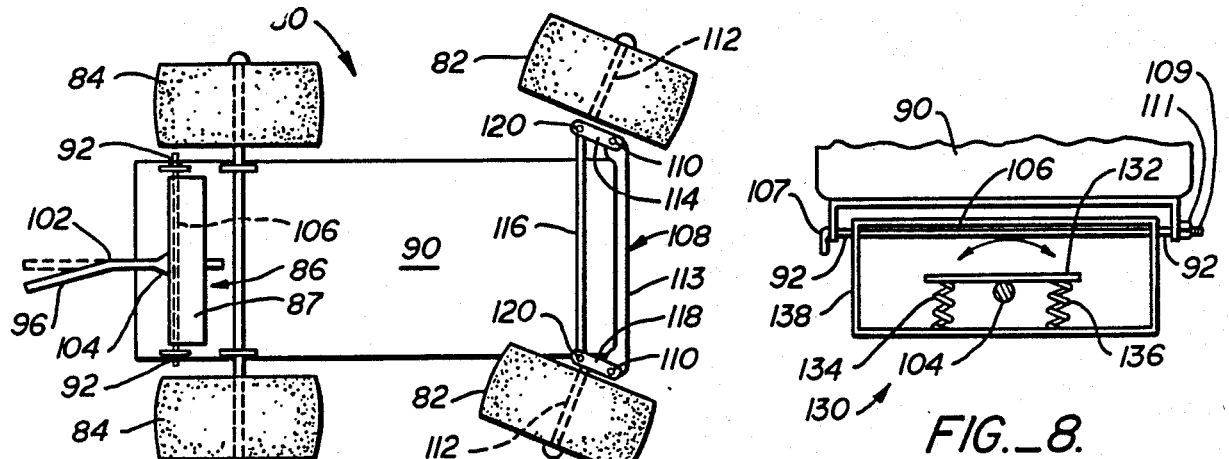
FIG._7.  FIG._8.
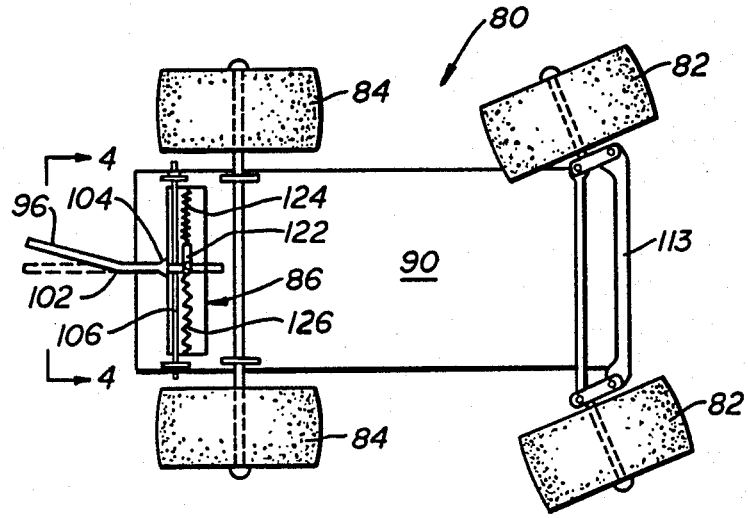
FIG._7A.
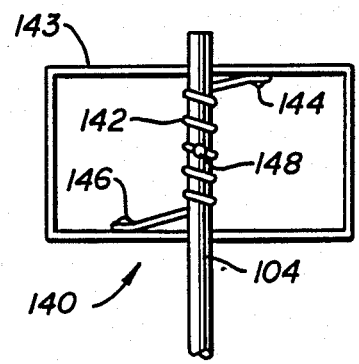
FIG._9.

STEERABLE WHEELED PUSHCART

This is a continuation-in-part of application Ser. No. 860,545, filed May 7, 1986, and now abandoned.

BACKGROUND OF THE INVENTION

1. Field of the Invention

This application relates to a novel steerable wheeled pushcart suitable for use as a child's toy. More particularly, it relates to such a pushcart having an improved steering mechanism that is safer and more reliable in operation than prior pushcart steering mechanisms.

2. Description of the Prior Art

The concept of a steerable, two-wheeled toy pushcart is known in the art. For example, such a pushcart is shown in U.S. Pat. No. 1,681,876, issued Aug. 21, 1928 to Peterson. However, the steering mechanism shown in that patent has significant safety hazards for children, with its exposed springs and scissors type of relative movement between the transverse axle and the steering handle, which create pinch and mash hazards. The relationship among the transverse axle, steering handle and springs in that pushcart also significantly limit design flexibility. If it is desired to cover the springs and therefore eliminate the pinching hazard associated with them, there is little variation possible in the configuration of the pushcart body. If the steering handle attachment is moved rearward on the pushcart body, the result is a tendency of the pushcart to jacknife. If the axle is moved rearward on the pushcart body, this results in an excessive forward bobbing of the pushcart body front end during turns. The resulting body to ground clearance reduction may produce a further safety hazard with sudden stoppage of forward motion.

Additional problems with the steering mechanism in that pushcart include warping of the diverging steering bars in their lateral plane when torsional steering forces are applied to them and gimbal locking of the steering mechanism when the king bolt has its longitudinal axis perpendicular to the ground. Increasing steering force is required as the steering handle is lowered, raising the king bolt toward the perpendicular position. This increased steering force accentuates the warping of the steering bars. A further pinch hazard exists at the propto-steering handle attachment point. Additionally, steering limits are not provided for and their presence in this design would create another mash or pinch hazard.

A similar design for a steerable, two wheeled pushcart is shown in Kounovsky, U.S. Pat. No. 1,097,102, issued May 19, 1914. That design is not capable of mimicking the self steering action of a car or truck.

Another example of a steerable pushcart is shown in U.S. Pat. No. 1,310,651, issued July 22, 1919 to De Long. In that design, a four wheeled pushcart has a steering handle connected to pivot the front wheels of the cart for steering. A four wheeled steerable toy vehicle similar to this design is commercially available from Sears under the designation Nylint "Steer Crazy" pickup.

An example of a self centering mechanism for a tilting platform type of roller skate is disclosed in Hanson, U.S. Pat. No. 321,434, issued July 7, 1985. However, that mechanism is not used with a vehicle having a steering handle, nor does the patent suggest such a usage.

Other examples of steerable pushcarts and similar devices are shown in the following issued U.S. patents: U.S. Pat. No. 1,446,140, issued Feb. 20, 1923 to Weber; U.S. Pat. No. 2,021,814, issued Nov. 19, 1935 to Stinson et al.; U.S. Pat. No. 2,800,337, issued July 23, 1957 to Avril; U.S. Pat. No. 2,859,975, issued Nov. 11, 1958 to Weaver et al.; U.S. Pat. No. 2,950,121, issued Aug. 23, 1960 to Fisher and U.S. Pat. No. 3,066,945, issued Dec. 4, 1962 to Prescott. Despite the many examples of such devices, a satisfactory solution to the problems associated with a steerable pushcart of the type disclosed in the Peterson patent is not available in the prior art.

While a wide variety of such pushcart designs are known in the prior art, a steering mechanism that will operate satisfactorily with either a two wheeled or a four wheeled pushcart has not been provided. In particular, there is no steering mechanism that will provide controllable steering of the front wheels of a four wheeled pushcart when all four wheels are on the ground and with the rear wheels when the front wheels are raised from the ground.

SUMMARY OF THE INVENTION

Accordingly, it is an object of this invention to provide a steerable pushcart having a steering mechanism for pivoting a body of the cart relative to a steering handle that is free of pinching and mashing hazards.

It is another object of the invention to provide such a steerable pushcart in which the steering mechanism is not subject to gimbal lock.

It is another object of the invention to provide such a steerable pushcart in which the steering mechanism does not impose substantially fixed design limits on the cart body.

It is a further object of the invention to provide such a steerable pushcart in which a scissors action between a transverse axle and a steering handle is avoided.

It is a still further object of the invention to provide such a steerable pushcart in which springs biasing the pushcart to a straight forward position with respect to a steering handle can be completely enclosed without dictating an overall shape of the pushcart body.

It is yet another object of the invention to provide such a steerable pushcart in which a steering handle of the pushcart also provides a means for automatically propping the handle and body of the cart in a substantially upright position when the steering handle is unattended.

It is another object of the invention to provide steering radius limit stops which are completely enclosed and therefore free of pinching and mashing hazards.

It is still another object of the invention to provide such a steerable pushcart with a steering mechanism that will give accurate steering of the front wheels of a four wheeled pushcart when the front wheels are on the ground and also accurate steering with the rear wheels when the front wheels are raised from the ground.

The attainment of these and related objects may be achieved with the novel steerable pushcart herein disclosed. A steerable pushcart in accordance with this invention has a body. At least two wheels are rotatably mounted on the body and are positioned to support the body on a surface. The wheels have a fixed orientation with respect to the body. A handle has a first end with a means for applying rotating force to the handle. The handle has a second end at an angle to the first end. The second end of the handle is rotatably attached to the body.

The handle of the steerable wheeled pushcart preferably has a lever arm extending from the second end of the handle. The pushcart additionally has opposing springs connected between the lever arm and the body. In operation, rotation of the handle causes the body to angle from its usual straight ahead position with respect to the handle. This angling in response to the rotation of the handle allows the body to be steered without a scissoring action with respect to the handle.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a perspective view of a steerable wheeled pushcart in accordance with the invention.

FIG. 2 is a side view of the steerable wheeled pushcart of FIG. 1.

FIG. 3 is a partial cross section view of the pushcart of FIGS. 1-2.

FIG. 4 is a schematic cross-section view with a cutaway of a portion of the pushcart of FIGS. 1-3, taken from the vantage point indicated by the line 4—4 in FIG. 3.

FIG. 5 is a top view of the pushcart of FIGS. 1-3.

FIG. 6 is a side view of another embodiment of a pushcart in accordance with the invention.

FIG. 6A is another side view of the pushcart shown in FIG. 6 in another operating position.

FIG. 7 is a bottom view of the pushcart of FIGS. 6 and 6A.

FIG. 7A is another bottom view of the pushcart of FIG. 7 in another operating position.

FIG. 8 is a partial section view of another embodiment of a steering mechanism for a pushcart in accordance with the invention.

FIG. 9 is still another embodiment of a steering mechanism for a pushcart in accordance with the invention.

DETAILED DESCRIPTION OF THE INVENTION

Turning now to the drawings, more particularly to FIGS. 1-3, there is shown a steerable wheeled pushcart 10 in accordance with the invention. The pushcart 10 has a body 12, supported on wheels 14, which are rotatably mounted on axle 16. The axle 16 is fixed in position with respect to the body 12, and steering of the pushcart 10 is accomplished solely by the interaction of handle 18 and the body 12, as is explained more fully below. The pushcart 10 is configured so that a child cannot sit in the body 12. A partition 20 blocks off the "seat" 22 from the remainder of the body 12 so that a child cannot insert his or her legs inside the body 12, as is best shown in FIG. 3. The pushcart 10 is intended as a fantasy play vehicle, and the child 24 can insert a stuffed toy 26 or other object in the seat 22. Hood 28 is hinged at 30 to allow access to compartment 32, which can also be used for holding toys and other objects. Younger children in particular enjoy putting objects into such compartments and removing them. Roll bar 34 and other detailing 36 gives the body 12 the appearance of a race car. Other forms of detailing and other shapes for the body 12 may be used to give the pushcart 10 the appearance of other types of vehicles.

Details of the handle 18 and its attachment to the body 12 are shown in FIGS. 2-4. Handle 18 has a steering wheel 38 at first end 40 for rotating the handle 18 with respect to the body 12, as indicated by arrow 42. Handle 18 arcs downward slightly at 44 and has a second end 46 at a substantially right angle to the first end 40. The second end 46 passes through rear panel 48 of the body 12 and is pivotally connected to the body 12 by means of a rotatable mounting in pivot block 50, which is fixedly attached to the bottom 51 of the body 12. Angle 52 serves as a rest to keep the body 12 in an almost horizontal position when the child 24 is not holding on to the steering wheel 38, as is shown in FIG. 2. A support 54 is provided on the bottom of the angle 52 to engage surface 55 for this purpose. Inside the body 12, a lever arm 56 is fixedly attached to the end 46 of the handle 18, and extends upward at a 90 degree angle to the end 46. Distal end 58 of the lever arm 56 is attached to opposing springs 59 and 60, which are respectively attached to sides 62 and 64 of the body 12. The lever arm 56 and the springs 59 and 60 operate to keep the handle 18 and body 12 in their straight ahead aligned position, with the lever arm 56 pointing upward, in the absence of a turning force on the steering wheel 38. Having the pivot block 50, lever arm 56 and springs 59 and 60 totally enclosed inside the body 12 is an important safety feature of the pushcart 10. Blocks 65 and 67 engage the lever arm 56 to the left and right, respectively, to act as steering radius limit stops for rotating of the handle 18 during steering.

FIG. 5 illustrates how the handle 18 is used to steer the pushcart 10. From the viewpoint of the child 24, as the steering wheel 38 is turned in a counterclockwise direction, indicated by arrow 68 in FIG. 5, angle 52 of the handle 18 moves to the position shown in solid line in FIG. 5. In order for the end 46 to maintain a fixed orientation with respect to the body 12 as this occurs, the body 12 angles as shown, thus turning the pushcart 10 as it is moved forward or backward with the handle 18 in this position. Turning the steering wheel 38 in the opposite direction, as indicated by arrow 66, moves end 52 to the position shown in dotted line, and angles the body 12 in the opposite direction, as also shown in dotted line. No scissoring action between the body 12 and the handle 18 occurs during such steering. When such turning force is released, the springs 59 and 60 return the handle 18 and body 12 to their straight, aligned position, as shown in FIG. 1.

FIGS. 6 and 6A show a four wheeled pushcart 80 in accordance with the invention. When the pushcart 80 is in the position shown in FIG. 6, it can be steered with front wheels 82, and when it is in the position shown in FIG. 6A, it can be steered with rear wheels 84 in the same manner as in the FIGS. 1-5 embodiment. Steering mechanism 86 at rear 88 of the pushcart 80 is configured in generally the same manner as the mechanism of FIG. 4, except that end 104 of the handle 96 extends horizontally and is supported by the walls of a rectangular enclosure 87, and the mechanism 86 has the rectangular enclosure 87 pivotally attached to body 90 at 92 by means of a rod 106, to give an extra degree of freedom of movement over the mechanism of FIG. 4. The pivots 92 allow steering wheel 94 and handle 96 to be moved to different positions as indicated in dotted line at 98 and by the arrow 100. The pivot 92 further allows the mechanism 86 to compensate for a bobbing action of the body 90 that would otherwise occur when the steering wheel 94 is turned. In FIG. 6A, the steering wheel 94 and handle 96 are lowered so that the rectangular enclosure 87 bottoms out against body 90 and the front wheels 82 are raised off the ground. In this position, the pushcart operates in the same manner as in the FIGS. 1-5 embodiment. This mode of operation adds play value to the pushcart 80 by allowing a user to do "wheelies".

Handle 96 connecting the steering wheel 94 to the steering mechanism 86 is angled at 102 (see also FIG. 7) so that turning the steering wheel 94 will have the same effect on the steering mechanism 86 as in the FIGS. 1-5 embodiment. Further details of the steering mechanism 86 and its operation are shown in FIGS. 7 and 7A. Front wheels 82 of the push cart 80 are connected to the body 90 by a caster linkage 108. The caster linkage 108 has pivot points 110 on bracket 113 in front of axles 112 of the wheels 82. The bracket 113 is fixed to the body 90. Tie rods 114, 116 and 118 are pivotally connected at the pivot points 110 and pivot points 120 in order to keep the wheels 82 parallel. As shown in FIG. 7A, the steering mechanism 86 includes a lever arm 122 connected to the end 104 of the handle 96. Opposed springs 124 and 126 are connected to the lever arm 122. Since these elements are configured and operate in the same manner as the corresponding elements in FIG. 4, as indicated by the line 4—4 in FIG. 7A, the steering mechanism 86 will not be described further.

In operation, with all four wheels 82 and 84 in contact with a supporting surface 128 (see FIG. 6), body 90 of the pushcart 80 maintains its straight ahead orientation when the steering wheel 94 is turned, for example, clockwise, which causes the handle 96 to move from a position aligned with the orientation of the body, as shown in dotted line, to the position shown in solid line in FIG. 7. At the same time, the front wheels 82 move to the right as shown, with the amount of their movement depending on the extent of turning the steering wheel, despite the absence of any mechanical linkage between the steering mechanism and the front wheels 82. As this movement occurs, the steering mechanism pivots slightly on the pivot points 92, since the body is not free to bob as the steering wheel is turned. When the steering wheel 94 is released, springs 124 and 126 return the handle 96 to its position aligned with the orientation of the body 90. When the steering wheel 94 is turned counterclockwise, handle 96 is moved to the position shown in solid line in FIG. 7A, and the front wheels 82 move to the left as shown.

FIG. 8 shows another form of a steering mechanism 130 for use in the pushcart of FIGS. 6-7A in place of the mechanism 86. The mechanism 130 is attached to pivots 92 in the same manner as the mechanism 86. A rod 132 is fixedly attached to and extends orthogonally and laterally from portion 104 of the handle 96. FIG. 8 shows a further detail of the rod 106 that enables the mechanism 86 (FIG. 7) or 130 to be removed from the pushcart 80 so that the wheeled body 90 can be used as a conventional toy truck. The rod 106 has a right angle bend 107 at one end and is threaded at 109 on the other end. Nut 111 holds the rod 106 in place and constitutes a quick release for removing the mechanism 86 or 130 from the pushcart 80. Springs 134 and 136 are connected between the rod 132 and enclosure 138 on either side of the handle portion 104. When the steering wheel is turned, the rod 132 pivots as handle portion 104 turns, compressing one of the springs 134 and 136 and compressing the other of the springs 134 and 136. Other than as shown and described, the construction and operation of the FIG. 8 mechanism is the same as that of the mechanism 86.

FIG. 9 shows a third form of a steering mechanism 140 for use in the pushcart of FIGS. 6-7A in place of the mechanism 130. In the mechanism 140, a torsional spring 142 is attached to enclosure 143 at its ends 144 and 146 and is fixedly attached at 148 to the handle portion 104 at approximately the midpoint of the spring 142. The torsional spring 142 could be replaced with a cylindrical elastomeric spring also attached to the enclosure 143 at its ends and to the handle portion 104 at its midpoint. Other than as shown and described, the construction and operation of the FIG. 9 mechanism is the same as that of the mechanism 86.

It should now be readily apparent to those skilled in the art that a novel steerable pushcart capable of achieving the stated objects of the invention has been provided. Rotation of the handle of the pushcart angles the body of the cart relative to the handle for steering. The steering mechanism is not subject to gimbal lock, does not create a pinching hazard, both because the handle does not scissor with respect to the body and because the steering mechanism, including steering radius limit stops, is entirely enclosed within the body. The handle shape provides an integral prop for the handle and body when the handle is unattended.

It should further be apparent to those skilled in the art that various changes in form and detail of the invention as shown and described may be made. It is intended that such changes be included within the spirit and scope of the claims appended hereto.

What is claimed is:

1. A steerable wheeled pushcart, which comprises a body, at least two wheels rotatably mounted on said body and positioned to support said body on a surface, said wheels having a fixed orientation with respect to said body, a handle having a first end with means for applying rotating force to said handle, said handle having a second end at an angle to the first end, the second end of said handle being rotatably attached to said body, said handle having a lever arm extending from the second end of said handle, said pushcart additionally comprising opposing springs connected between the lever arm and a support fixed with respect to said opposing springs, said pushcart additionally comprising a pair of front wheels rotatably and pivotally mounted on said body, said handle being rotatably attached to said body by a steering mechanism, said steering mechanism being pivotally attached to said body for movement about an axis normal to a longitudinal axis of said body, said pair of front wheels being pivotally responsive to movement of said body produced by rotation of said handle when said pair of front wheels rests on a supporting surface.

2. The steerable wheeled pushcart of claim 1 in which the lever arm and said opposing springs are enclosed by said body.

3. The steerable wheeled pushcart of claim 2 additionally comprising a pair of steering radius limit stops fixedly attached to said body on either side of the lever arm and positioned to be contacted by the lever arm.

4. The steerable wheeled pushcart of claim 1 in which said pair of front wheels is pivotally attached to said body by a pair of pivot points in front of an axle on which said front wheels are rotatably mounted, said pushcart additionally including a plurality of tie rods connecting said pair of wheels for pivotal movement together.

5. The steerable wheeled pushcart of claim 4 in which said lever arm extends upward from said handle and said pair of opposed springs extend laterally of said handle from said lever arm.

* * * * *